(12) United States Patent
Anschutz et al.

(10) Patent No.: US 10,298,516 B2
(45) Date of Patent: May 21, 2019

(54) SYSTEM AND METHODS FOR SHARING RESOURCES AMONG APPLICATION MODULES

(71) Applicant: Lexmark International Technology, Sarl, Meyrin (CH)

(72) Inventors: Cynthia Diane Anschutz, Overland Park, KS (US); Shane Evan Blazek, Shawnee, KS (US); David Mark Elton, Kansas City, KS (US); Kristopher John Andrew Haney, Olathe, KS (US)

(73) Assignee: HYLAND SWITZERLAND SÀRL, Geneva (CH)

( * ) Notice: Subject to any disclaimer, the term of this patent is extended or adjusted under 35 U.S.C. 154(b) by 160 days.

(21) Appl. No.: 15/132,880

(22) Filed: Apr. 19, 2016

(65) Prior Publication Data

US 2017/0302592 A1 Oct. 19, 2017

(51) Int. Cl.
*G06F 12/0871* (2016.01)
*H04L 12/927* (2013.01)
*G06F 12/0866* (2016.01)
*G06F 12/0806* (2016.01)
*H04L 12/919* (2013.01)
*H04L 12/911* (2013.01)

(52) U.S. Cl.
CPC ........ *H04L 47/803* (2013.01); *G06F 12/0806* (2013.01); *G06F 12/0866* (2013.01); *G06F 12/0871* (2013.01); *H04L 47/765* (2013.01); *H04L 47/822* (2013.01)

(58) Field of Classification Search
CPC .......... G06F 11/3409; G06F 17/30864; G06F 3/0631; G06F 8/61; G06F 12/0866; G06F 12/0806; G06F 12/0871; G06Q 40/04; H04L 43/0876; H04L 63/08; H04L 67/1095; H04L 67/1097; H04L 47/803; H04L 47/822; H04L 47/765
See application file for complete search history.

(56) References Cited

U.S. PATENT DOCUMENTS

2016/0112429 A1* 4/2016 Sundaresan ............. H04L 63/08
726/4
2016/0179891 A1* 6/2016 Bowman ........... G06F 17/30864
707/720
2016/0378450 A1* 12/2016 Fu ............................ G06F 8/61
717/177
2017/0006102 A1* 1/2017 Mody ................. H04L 67/1097
2017/0220447 A1* 8/2017 Brandt .................. G06F 9/4812
2017/0278186 A1* 9/2017 Creighton, IV ....... G06Q 40/04
2017/0289002 A1* 10/2017 Ganguli ............. H04L 43/0876
2017/0293447 A1* 10/2017 Bivens ................. G06F 3/0631
2017/0295234 A1* 10/2017 Nakamura .......... H04L 67/1095

* cited by examiner

*Primary Examiner* — Le H Luu
(74) *Attorney, Agent, or Firm* — Medley, Behrens & Lewis, LLC

(57) ABSTRACT

A system and method for sharing resources among application modules includes receiving, on an application including a plurality of modules, a resource from a server; determining a storage position identifier corresponding to an identifier of the resource and indicative of a storage position in a database for storing resources dedicated for the application; and storing the resource in the database based on the determined identifier for sharing among the plurality of modules.

19 Claims, 3 Drawing Sheets

SYSTEM AND METHODS FOR SHARING RESOURCES AMONG APPLICATION MODULES

CROSS REFERENCE TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Technical Field

The present invention relates to storing application data and more particularly to caching resources to a storage location shared by a plurality of modules in a modular application.

2. Description of the Related Art

A modular application includes a plurality of modules for performing particular tasks. A modular application for instance, may include a text processing module, a photo editing module, and a web browsing module (or web browsers). Each module is typically connected to a server appropriate for providing data or resource that it may need for executing a task. For example, a web browser may be communicatively connected to a web server for retrieving a web page that it needs to display on its interface.

It is often imperative in a modular application that resources requested by a module remain exclusive for use by that module. However, other modules in the modular application may have a need for the same resource in particular instances. Although the modules all form part of the modular application, resources may not be communicated or shared among them. Further, since the modules may be developed in different technologies or by different providers, modifying each module to include a function for communicating or sharing resources with other modules in the application may be time-consuming. In some aspects, modifying each module to conform to a standard resource communication protocol in the modular application may not be possible. A problem is presented when the same resource may be repeatedly requested and stored in the modular application. A significant overhead for duplicate copies of one resource may present another problem.

Accordingly, there is a need for a system and methods for efficiently managing resource requests made by modules in an application. There also exists a need for a storage mechanism or location where previously requested resources may be stored for sharing among modules in a modular application.

SUMMARY

A system and methods for sharing resources among at least two independent modules in a modular application and implementing an optimized application resource retrieval system are disclosed.

In one example embodiment, a method for sharing resources among application modules includes receiving a resource on an application including a plurality of modules; determining a storage position identifier corresponding to an identifier of the resource and indicative of a storage position in a database for storing resources dedicated for the application; and storing the resource in the database based on the determined identifier for sharing among the plurality of modules.

In a second example embodiment, a method for implementing an optimized application resource retrieval system includes establishing, by an application including a plurality of browsers, a communications link with a server for requesting for a set of resources; providing a cache in the application for storing a set of identifiers associated with the set of resources; and linking each identifier in the set of identifiers in the cache to a storage position location in a database, wherein a resource requested by at least two browsers of the plurality of browsers is retrieved from the server once and stored in the database for accessing by the other of the plurality of browsers. Further, a first and a second browser of the plurality of browsers are operating independent of each other in the application, such that data on one of the at least two of the plurality of browsers is not accessible by the other plurality of browsers.

Other embodiments, objects, features, and advantages of the disclosure will become apparent to those skilled in the art from the detailed description, the accompanying drawings and the appended claims.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION OF THE DRAWINGS

Figure 1:
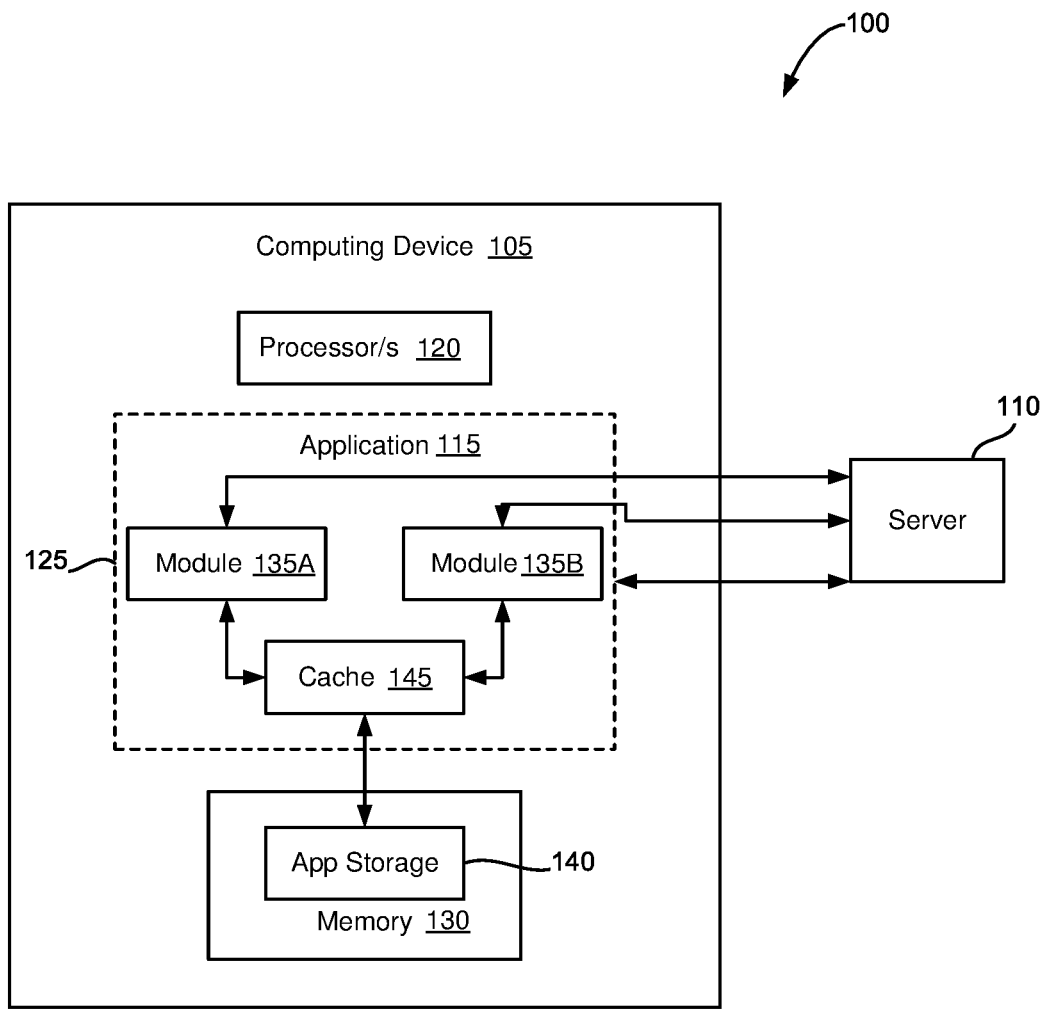
FIG. 1 shows one example embodiment of a system for requesting and storing resources for use by modules in a modular application for execution on a client device.

It is to be understood that the disclosure is not limited to the details of construction and the arrangement of components set forth in the following description or illustrated in the drawings. The disclosure is capable of other example embodiments and of being practiced or of being carried out in various ways. For example, other example embodiments may incorporate structural, chronological, process, and other changes. Examples merely typify possible variations. Individual components and functions are optional unless explicitly required, and the sequence of operations may vary. Portions and features of some example embodiments may be included in or substituted for those of others. The scope of the disclosure encompasses the appended claims and all available equivalents. The following description is therefore, not to be taken in a limited sense, and the scope of the present disclosure is defined by the appended claims.

Also, it is to be understood that the phraseology and terminology used herein is for the purpose of description and should not be regarded as limiting. The use herein of "including", "comprising", or "having" and variations thereof is meant to encompass the items listed thereafter and equivalents thereof as well as additional items. Further, the use of the terms "a" and "an" herein do not denote a limitation of quantity but rather denote the presence of at least one of the referenced item.

In addition, it should be understood that example embodiments of the disclosure include both hardware and electronic components or modules that, for purposes of discussion, may be illustrated and described as if the majority of the components were implemented solely in hardware.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other data processing apparatus may create means for implementing the functionality of each block or combinations of blocks in the diagrams discussed in detail in the description below.

These computer program instructions may also be stored in a non-transitory computer-readable medium that may direct a computer or other programmable data processing apparatus to function in a particular manner, such that the instructions stored in the computer-readable medium may produce an article of manufacture, including an instruction means that implements the function specified in the block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus implement the functions specified in the block or blocks.

Accordingly, blocks of the diagrams support combinations of means for performing the specified functions, combinations of steps for performing the specified functions and program instruction means for performing the specified functions. It will also be understood that each block of the diagrams, and combinations of blocks in the diagrams, can be implemented by special purpose hardware-based computer systems that perform the specified functions or steps, or combinations of special purpose hardware and computer instructions.

The present disclosure provides an application resource retrieval system and methods that provide seamless retrieval of resources for use by one or more modules in an application. The application resource retrieval system enables an application having at least two modules in need of the same resource to share the resource. As will be described in detail below, an application resource or resource may refer to any kind of data that may be requested by the modular application itself or any of the modules therein. In one aspect, the resource may be data used in performing one or more particular tasks on the modular application such as, for example, calculation of values, displaying user information, and the like. In another aspect, a resource may refer to data associated with a configuration or display of the modular application on a computing device and/or interface thereof, such as an icon associated with the modular application. A resource may be retrieved from a storage location such as, for example, a remote server.

FIG. 1 is a block diagram of one example embodiment of an application resource retrieval system 100 including a computing device 105 for executing one or more applications and a server 110 communicatively connected to computing device 105. Applications executing on computing device 105 includes an application 115 that may request for one or more resources from server 110.

Computing device 105 may be any processing device capable of executing applications, such as application 115. Computing device 105 may be, for example, a desktop computer, a server computer, a mobile device, or a multi-function product (MFP). Computing device 105 may include one or more processors 120 that process software and other machine-readable instructions and a memory 130 that stores the software and other machine-readable instructions. Memory 130 may include volatile and/or non-volatile memory. Computing device 105 may also include a computer-readable medium 125 for loading software as well as other machine-readable instructions, such as application 115. Computer-readable medium 125 may be volatile or non-volatile, removable or non-removable, and/or a combination of the foregoing, such as a CD, smart card, USB stick, and hard drive, among others. Computer-readable medium 125 may be memory 130 and application 115 is loaded via memory 130.

Computing device 105 may include a display monitor (not shown) for outputting information generated by one or more processors 120. In other example embodiments, the display monitor may be used for inputting data to computing device 105, such as a touch screen panel. In the same example, one or more processors 120 may be able to detect or capture an input of a user on the panel and a location of impact may be calculated. Corresponding data based on the user input may then be determined. The determined data may be used on computing device 105 as data for application 115, for instance.

Further, computing device 105 may be communicatively connected with one or more peripheral devices (not shown) that may be utilized by the user to perform input or output operations on the computing device 105. The one or more peripheral devices may be communicatively connected to one or more processors 120. The one or more peripheral devices may include a mouse, a keyboard, a webcam, a scanner, a set of speakers, and/or the like. Other internal or external peripheral devices, regardless of a device type, may be apparent in the art.

Computing device 105 may be operating on a particular hardware and/or software platform. The one or more peripheral devices as well as the software or applications executing on computing device 105 may be compatible with the particular hardware and/or software platform the computing device is operating in. Computing device 105 may include an operating system for managing one or more tasks associated with hardware and/or software components and/or peripheral devices associated with computing device 105. The operating system may be loaded from memory 130 or computer-readable medium 125 of computing device 105. Other types of software may be stored on or loaded from computer-readable medium 125 besides application 115.

Server 110 may be any system including software and/or hardware that hosts a plurality of resources. Examples of server 110 may include, but are not limited to, a personal computer, a server computer, a mini computer, a mainframe computer, or a series of the foregoing. Server 110 may also be a web server or a series of web servers hosting web content (resources) for application 115. In other example embodiments, server 110 may be a database server.

While not shown in the figures, server 110 may be accessed by computing device 105 through a network allowing communications between two or more computing systems, as discussed herein, and/or available or known at the time of the filing, and/or as developed after the time of filing. The network may be, for example, a communications network or network/communications network system such as, but not limited to, a peer-to-peer network, a Local Area Network (LAN), a Wide Area Network (WAN), a public network such as the Internet, a private network, a cellular network, or a combination of the foregoing. The network may further be a wireless, a wired, and/or a wireless and wired combination network.

Application 115 may be any application comprised of a set of one or more functional units, commonly referred to as modules (135A, 135B), that are integrated or linked to form application 115. The functional units or modules may be customized for each application 115. Customization of modules to be included in application 115 may be managed by an administrator thereof. In one example embodiment, modules 135A, 135B may be executed on computing device 105 alongside execution of application 115. In other example embodiments, modules 135A and 135B may be integrated or executed separately within application 115. Module 135B, for example, may be integrated or added to application 115 after integration of module 135A such that the module 135B is dependent on 135A.

Application 115 may refer to software, firmware, and/or a combination of software and firmware on computing device 105. In one example embodiment, application 115 may be accessed from a remote location such as server 110 for execution on computing device 105. Application 115 may be, for example, a web application accessed through a browser of computing device 105. The browser may be a web browser or any other similar program that accesses information from the World Wide Web, or from a remote computer, such as server 110. A location identifier or address associated with the remote location, such as a Uniform Resource Locator (URL) may be used for executing application 115 on computing device 105.

In another example embodiment, application 115 may be an executable code for installation on computing device 105 and stored in memory 130. In other alternative aspects, application 115 may be received from an external computer-readable medium embedded or attached to computing device 105. Application 115 may be executed on computing device 105 upon its installation, and modules 135A, 135B may be added—in a simultaneous or asynchronous manner—for performing tasks on application 115. An element on a user interface of computing device 105 may be created upon integration or installation of application 115, such as a desktop icon or an application shortcut link. Said user interface element may then be utilized by a user of computing device 105 for launching application 115 on computing device 105 for performing one or more functions.

Each of modules 135A and 135B may be a set of code for performing a specific function on application 115. For example, module 135A may be a resource viewing module, while module 135B may be a module for displaying a documentation file of application 115 (e.g., an about module). Further, any of modules 135A and 135B may be utilizing one or more resources remotely stored on and may be retrieved from server 110.

In one example embodiment, modules 135A and 135B may be accessed from server 110 in order to load application 115 at runtime on computing device 105. In alternative example embodiments, modules 135A and/or 135B may be stored in computing device 105 such that a connection to server 110 may not be needed in order to load the module/s on application 115. In other example embodiments, modules 135A and/or 135B may be deployed to any application 115 regardless of a type or platform of the computing device 105 it is being executed in.

Each of modules 135A and 135B may include a user interface component for displaying resources and/or other data associated with the module. The user interface component may be a browser for accessing resource content. Respective browsers associated with each module may be embedded therein and executed upon activation or execution of the module within application 115. Module 135A browser may not be aware of the module 135B browser or any resource included in or associated with the former, and vice-versa.

In one example embodiment, at least a portion of memory 130 of computing device 105 may be allocated for storing resources for application 115, as represented by an application storage 140 in FIG. 1. Application storage 140 may be dedicated for storing resources associated with application 115 and isolated from other applications on computing device 105. One or more resources specific for a module and/or a user of application 115 may also be separated or isolated within application storage 140. One or more data storage mechanisms may be employed on application storage 140 for isolating application-specific and/or user-specific resources.

Resources stored in application storage 140 may be classified according to date of creation, size of files, and/or session term, among others. Storing resources on application storage 140 may include grouping resources such as in a folder or package. Each stored resource on application storage 140 may include a unique identifier which may be used for retrieval by application 115. In one aspect, one or more resources in application storage 140 may be persistent. How persistent the one or more resources may be stored in application storage 140 may be predetermined by an administrator or user of application 115. For example, resource storage may be session-based or resources accumulated by a user of application 115 at a start of a usage session may be stored in application storage 140 until the end of the session. In other examples, application storage 140 may configured to collectively remove stored resources every month, or as specified by the administrator or the user of application 115. In another aspect, one or more resources stored on application storage 140 may be archived. How resources may be managed may be predetermined by the administrator or the user, and will be known to those skilled in the art.

Although application storage 140 is shown as a component of memory 130 on FIG. 1, application storage 140 may be a storage mechanism external to computing device 105, such as in a remote database or an external computer-readable medium or memory communicatively connected with computing device 105. For example, a user of application 115 may indicate on application 115 a location or address of application storage 140 in the network for accessing resources.

To further describe the methods of the present disclosure, application 115 includes a cache 145—a program component for storing and/or retrieving one or more resources from application storage 140. Cache 145 includes one or more computer-readable instructions for determining whether a resource requested by any module in application 115 is stored in application storage 140 or has been previously requested by any of the modules. Cache 145 may include a data structure that automatically assigns a resource (regardless of the requesting module) to a unique storage position on application storage 140, such as, for example, a hash function. For example, a file name of a text document may be converted to a hash value indicative of a location of the text document as it is stored in application storage 140. In other example embodiments, cache 145 may include an encrypting function for encrypting a resource and/or its identifier such that the resource, as it is stored on application storage 140 may only be retrieved by a corresponding decoding module of application 115.

Because application 115 includes cache 145 and cache 145 is communicatively coupled to application storage 140, application 115 is able to store and retrieve resources that have been previously requested by any of modules 135A, 135B instead of asking for resources from server 110 repeatedly. In one example embodiment, modules 135A and 135B may each include a cache for storing module-specific data or resources. However, cache 145 and/or application storage 140 may be utilized for storing one or more resources that may be determined to be shared across modules in application 115.

Figure 2:
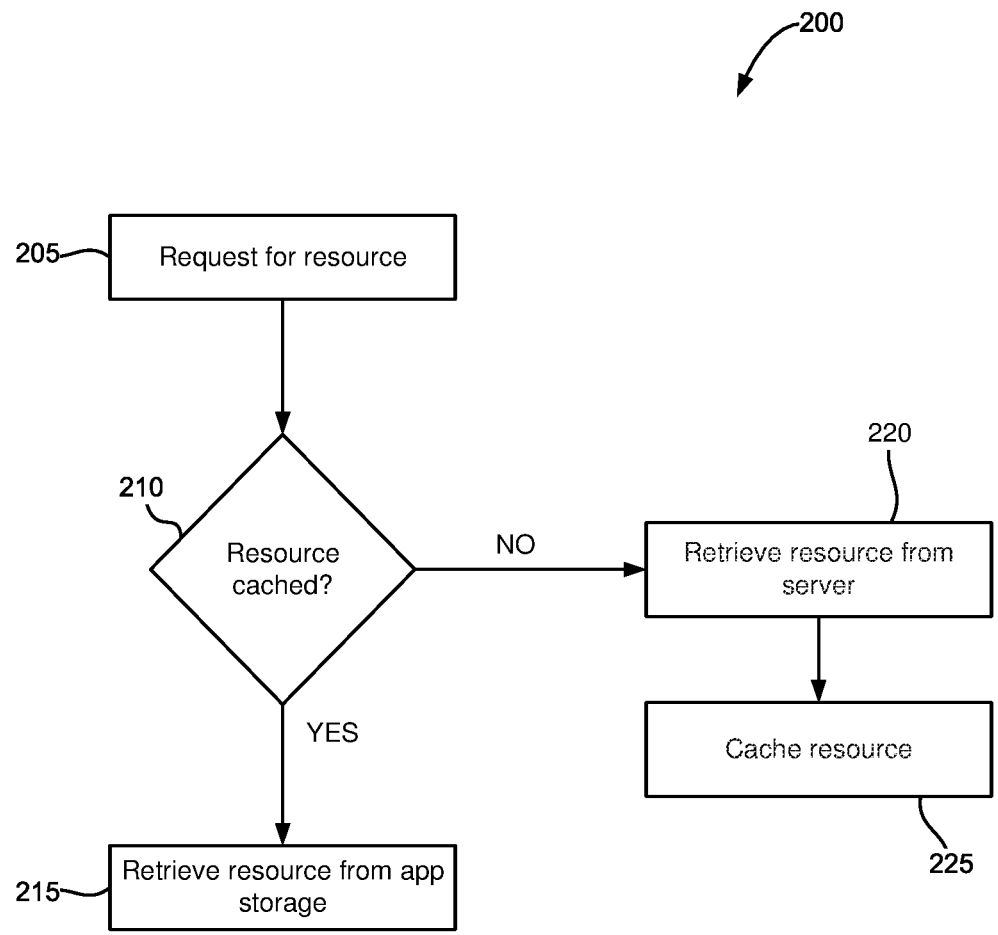
FIG. 2 is one example flowchart of a method for storing resources to be shared among modules in the modular application.
Figure 3A:
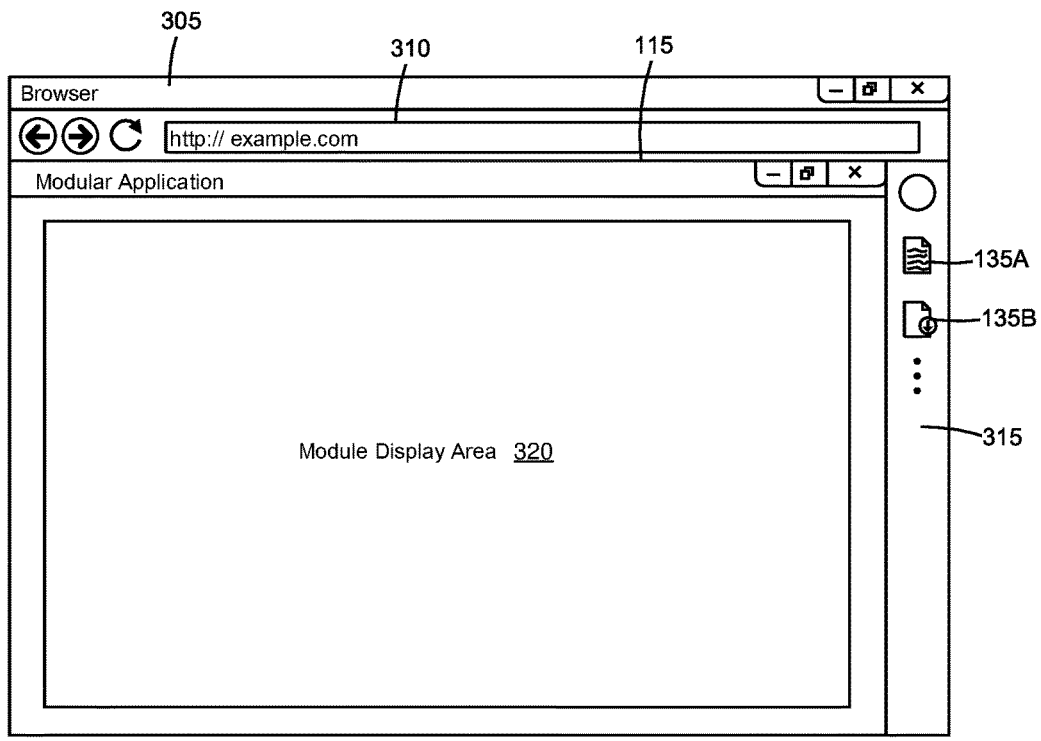
FIGS. 3A-3B show one example embodiment of a modular application including one or more modules each having a browser.
Figure 3B:
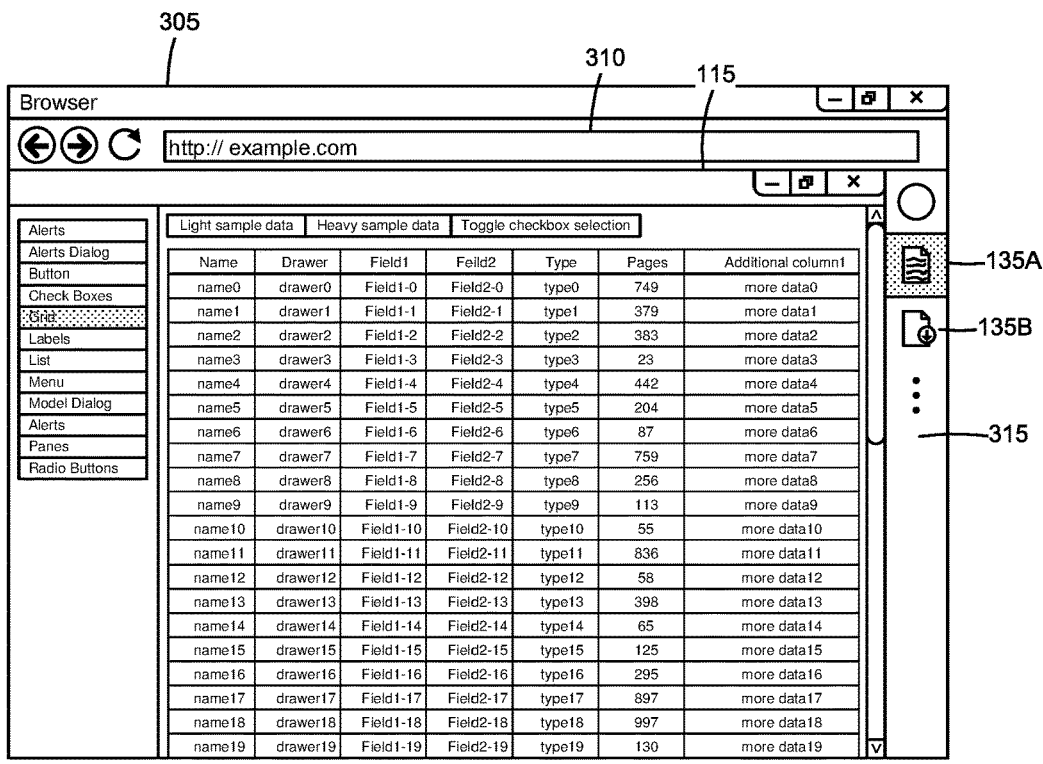

FIG. 2 shows one example flowchart of a method 200 for storing resources for sharing among modules 135A, 135B of application 115. To further illustrate method 200, FIGS. 3A-3B show example embodiments of application 115 executed via a browser 305 of computing device 105. Browser 305 may include an address field 310 that may be used for indicating an address or URL of application 115. In this example embodiment, application 115 may be a web application.

The address to be indicated on address field 310 for accessing web application 115 may be a hypertext URL, such as http://example.com. In other example embodiments, a file URL indicative of a location of application 115 as it is stored on computing device 105 or on another remote location may be indicated on address field 310. The file URL may be indicated in the following example format: file:///C:/example.exe. Other address formats for accessing application 115 as well as techniques in executing application 115 in computing device 105 are apparent in the art.

Application 115 on browser 305 may include a module list 315 displaying one or more graphical user-interface objects (e.g., icons) each representative of modules 135A, 135B and an embedded browser or module display area 320 for displaying content associated with a corresponding module, according to one example embodiment. Module list 315 may resemble at least one of a toolbar, a drop down list menu, a grid of icons, or any other panel format. Herein, modules 135A and 135B are modules selected by an administrator or a user to be included in and simultaneously executed with application 115.

Module display area 320 may be a browser for generating content associated with a module. Content displayed on module display area 320 may be associated to an active or a currently selected module. For example, when module 135A is selected on module list 315, a table for the resources associated with application 115 may be displayed on module display area 320, as shown on FIG. 3B. In another example, module display area 320 may be an embedded browser used in searching and retrieval resources.

In other example embodiments, modules 135A and 135B may have separate display areas. In alternative example embodiments, other modules may not have a display associated with each of them to be shown on module display area 320; instead, the module may perform other operations on application 115. Operations performed by any of the modules included in application 115 may be inherent to the application itself, such as a computation function. Module display area 320 may also display other elements included in application 115, such as, for example, a home page; a site map; a list of logged users; and other content known in the art. Further, other example embodiments for a layout of application 115—as it is executing in browser 305—may be apparent in the art.

In another aspect, module list 315 and module display area 320 may be loaded on a shell (not shown) of computing device 105. The shell may be a UI component for dynamically loading modules 135A, 135B and their corresponding interfaces on browser 305. The shell may be a framework or handler for modifying a display on browser 305 based on information contained in or associated with the modules. The shell may be responsible for determining when to show or hide Module 135A and when to show or hide Module 135B. The shell may contain user interface components that are displayed regardless of whether Module 135A and/or Module 135B is shown or hidden such as, for example, an application header, a user status, or a log out button.

Each of modules 135A and 135B may be developed, tested, and/or deployed using different methodologies. They may be operating independently on application 115, such that module 135A may not be communicatively coupled with module 135B. Any functions or operations on module 135A may not involve 135B. Since modules 135A and 135B are integrated on or linked to form application 115, the application may communicate with each of the modules. Communicating with the modules may be executed through the shell. The shell of computing device 105 included in application 115 therefore acts as a bridging component between modules. The modules may be able to communicate to the shell through a common, standard interface of application 115. As shown in FIG. 3A, the standard interface may include a plurality of graphical objects that may be used for executing operations on application 115 or any of its modules.

The flow in which resources are stored and/or retrieved using cache 145 and application storage 140 will now be detailed in method 200 of FIG. 2. At block 205, module 135A may request for a resource. The request may be triggered by one or more actions performed by a user of application 115 on browser 305. In one example embodiment, the resource may be associated with the module upon execution of the module on application 115. For purposes of example, an administrator of application 115 may select module 135A and consequently a set of resources (e.g., icons, captions, or other graphic objects on module list 315) associated with module 135A may be retrieved from server 110 for display on application 115. In another example embodiment, a new user may log in for access on application 115. The resources in this example may be a set of account information such as, for example, a username, a set of documents, and associated modules, that are associated with the user.

In one aspect of the example embodiment, application 115 may be able to detect that module 135A is in need of a resource. Detection may be automatically performed by one or more program instructions on application 115, such as through the shell. Detecting whether or not a module in application 115 may be in need of a resource may include determining whether or not the resources associated with each module are updated and/or new resources may need to be added.

In yet another example embodiment, the request for a resource may be associated with an input on module display area 320 corresponding to a request valid for a currently selected module in application 115. The input may be any action detected on content generated on module display area 320 corresponding to the currently selected module, such as, for example, selection of an item, entering of characters on a data field, manipulating items displayed on module display area 320, clicking of a button or a link, and the like. Application 115 may include methods to detect input on module display area 320 (e.g., action listener classes). The type of input detected may depend on a group of interface elements on application 115, which may be for instance, a click, a selection, a touch on a panel of computing device 105, among others.

At block 210, module 315A may determine whether or not there is a need for sending a request to server 110 for the resource in block 205 by checking cache 145. Checking cache 145 for the resource may include determining a resource identifier corresponding to the requested resource. Cache 145 may include one or more program functions or methods for performing the determination. Determining the resource identifier corresponding to the requested resource may include converting an identifier of the requested resource to a particular format recognized by application storage 140. Other mechanisms for converting the identifier of the requested resource besides a hashing may be apparent in the art.

An identifier of the requested resource may be, for example, a file name, user name, metadata, keyword or content phrase, context type, and/or the like. The format may be any kind of format standard in storing data to application storage 140 such as, for example, a series of alphanumeric characters, an index number, or code. Converting or transforming an identifier of the requested resource to a particular format may protect cached resources from being accessed by any other applications, modules, and/or devices, depending on how application 115 may be configured.

In other example embodiments, cache 145 may include a list of resources and their corresponding resource identifiers indicative of their locations on application storage 140, such as a data map. Thus, checking cache 145 for a presence of the requested resource may include determining whether or not the requested resource corresponds to a resource included in cache 145 that may be listed or mapped. Resource identifiers included (listed or mapped) in cache 145 may be indicative of a location of a resource as it is (or will be) stored on application storage 140, such as a database primary key.

Upon determining that the resource is stored and/or has been previously requested (i.e., cache hit), the requested resource may be retrieved from application storage 140 at block 215. Cache 145 may use the identifier of the requested resource to retrieve the resource from its associated location on application storage 140. For example, an identifier of the requested resource may indicate that the stored resource may be located at a . . . /appData/docABC folder in memory 130.

However, upon determining that the resource is not cached to application storage 140 (i.e., cache miss), the resource may be retrieved by the requesting module (in this instance, module 135A) from server 110 at block 220. The newly retrieved resource and/or its identifier may be converted for identifying its storage position location on application storage 140. A particular position or portion of the stored resource in application storage 140 may then be mapped on cache 145 as a resource identifier at block 225. In other examples, in an event that resources may have the same storage position identifiers, a previously stored resource may be replaced by the newly retrieved resource and/or the newly retrieved resourced may be stored in another available storage position identifier, as is apparent in the art of hashing. How resource identifiers may be mapped to stored resources may be known in the art.

Alternatively, blocks 220 and 225 may be performed by cache 145. Cache 145 may include one or more computer-readable instructions for retrieving a requested resource from server 110, determining a resource identifier for the resource, storing the retrieved resource to application storage 140 based on the resource identifier, and mapping the resource identifier to cache 145 for accessing by other modules in application 115 requesting for the same resource.

Resources to be retrieved and stored from server 110 may be predetermined. In one example embodiment, only those resources for sharing among modules 135A and 135B may be included in cache 145. Administrators or users of application 115 may also predetermine one or more types of resources to be cached.

It will be appreciated that the actions described and shown in the example flowcharts may be carried out or performed in any suitable order. It will also be appreciated that not all of the actions described in FIG. 2 needs to be performed in accordance with the example embodiments and/or additional actions may be performed in accordance with other example embodiments of the disclosure.

Many modifications and other embodiments of the disclosure set forth herein will come to mind to one skilled in the art to which these disclosure pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method for sharing resources among application modules, comprising:
   receiving a resource on an application implemented on the computer, the application including a plurality of modules;
   determining a storage position identifier corresponding to an identifier of the resource and indicative of a storage position in a database for storing resources dedicated for the application; and
   storing the resource in the database based on the determined identifier for sharing among the plurality of modules; and
   wherein a first of the plurality of modules operates independently from other of the plurality of modules such that data stored on the first module is not accessible by the other of the plurality of modules.

2. The method of claim 1, wherein the storage position identifier of the stored resource is mapped in an application cache; and
   the method further comprising retrieving a second resource from the database when it is determined that a storage position identifier of the second resource is included in the application cache.

3. The method of claim 1, wherein the storage position identifier of the resource is used to determine whether the resource is stored in the database or not.

4. The method of claim 1, wherein the resource is requested by at least one module of the plurality of modules.

5. The method of claim 1, wherein the determining the storage position identifier includes converting the identifier of the resource to a format predefined for a plurality of storage position identifiers in the database.

6. The method of claim 1, wherein the determining the storage position identifier includes identifying a hash value corresponding to the identifier of the resource.

7. The method of claim 1, wherein the receiving, the determining, and the storing is performed for a predetermined amount of time.

8. The method of claim 1, wherein the application has access, via the database, to all resources previously requested by any of the plurality of modules, without the application needing to request access to the resources via a server.

9. A computer-implemented method for an optimized application resource retrieval system, the method comprising:
establishing, by an application implemented on the computer and including a plurality of browsers, a communications link with a server, wherein the communications link is operable for requesting for a set of resources;
providing, in the application, a cache for storing a set of identifiers associated with the set of resources; and
linking each identifier in the set of identifiers in the cache to a storage position location in a database,
wherein a resource requested by at least two browsers of the plurality of browsers is retrieved from the server once and stored in the database for accessing by other of the plurality of browsers; and
wherein the cache stores only resources shared among the plurality of browsers.

10. The method of claim 9, wherein a first and a second browser of the plurality of browsers are operating independent of each other in the application; and wherein data on one of the at least two of the plurality of browsers is not accessible by the other plurality of browsers.

11. The method of claim 9, wherein the database is stored in a memory of a computing device in which the application is executing.

12. The method of claim 9, wherein the one or more resources are stored in a portion of the database isolated for the application.

13. The method of claim 9, wherein the establishing the communications link with the server is performed upon a positive determination that at least one browser of the plurality of browsers is requesting for a resource.

14. A computing device with a non-transitory computer-readable storage medium having one or more computer-executable instructions to:
determine, in an application, whether a resource is stored in a memory based on a storage position identifier corresponding to an identifier of the resource and indicative of a storage position in the memory; and
upon a negative determination:
request the resource from a server including one or more resources;
determine a storage position identifier corresponding to the identifier of the resource; and
store the resource in the memory based on the determined storage position identifier for sharing among a plurality of modules included in the application; and
wherein a first module of the plurality of modules in the application is operating independently from a second module.

15. The computing device of claim 14, wherein the plurality of modules included in the application is dependent on configuration by a user of the application.

16. The computing device of claim 14, further comprising one or more computer-executable instructions configured, in response to determining that the resource is stored in the memory, to retrieve the resource from the memory based on the corresponding storage position identifier.

17. The computing device of claim 14, wherein the memory is an external memory communicatively connected to the computing device.

18. The computing device of claim 14, wherein the instructions to determine are configured to be executed upon a positive determination that at least one of the plurality of modules requested the resource.

19. The computing device of claim 14, wherein the instructions to determine are configured to be executed only during a session of using the application.

* * * * *